US008655368B2

(12) United States Patent
Dimou et al.

(10) Patent No.: US 8,655,368 B2
(45) Date of Patent: Feb. 18, 2014

(54) METHOD AND ARRANGEMENT FOR SUPPORTING MULTIPLE SETTINGS OF MOBILITY TRIGGERS IN A TELECOMMUNICATIONS SYSTEM

(75) Inventors: Konstantinos Dimou, Stockholm (SE); Muhammad Ali Kazmi, Bromma (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 169 days.

(21) Appl. No.: 13/126,778

(22) PCT Filed: Jun. 9, 2009

(86) PCT No.: PCT/SE2009/000292
§ 371 (c)(1),
(2), (4) Date: Jun. 14, 2011

(87) PCT Pub. No.: WO2010/050869
PCT Pub. Date: May 6, 2010

(65) Prior Publication Data
US 2011/0237259 A1   Sep. 29, 2011

Related U.S. Application Data

(60) Provisional application No. 61/109,765, filed on Oct. 30, 2008.

(51) Int. Cl.
*H04W 36/00* (2009.01)
(52) U.S. Cl.
USPC ......................................................... 455/437
(58) Field of Classification Search
USPC ......... 455/436, 446, 442, 437, 449, 453, 561; 370/331, 328, 329, 445, 335, 332, 338
See application file for complete search history.

(56) References Cited

U.S. PATENT DOCUMENTS

| 7,302,263 B2 * | 11/2007 | Kim ............................. 455/436 |
| 2004/0109424 A1 * | 6/2004 | Chheda ........................ 370/331 |
| 2009/0005052 A1 * | 1/2009 | Abusch-Magder et al. .. 455/446 |

OTHER PUBLICATIONS

3RD Generation Partnership Project. "Performance of Mobility State Detection based Cell Reselection-Further Simulation Results." 3GPP TSG-RAN WG4 Meeting #48bis, R4-082491, Edinburgh, UK, Sep. 29-Oct. 3, 2008.
3RD Generation Partnership Project. "Handling of Multiple Triggered Events." 3GPP TSG RAN WG2 #62, Tdoc-R2-082632, Kansas City, USA, May 5-9, 2008.

(Continued)

*Primary Examiner* — Kiet Doan
(74) *Attorney, Agent, or Firm* — Coats & Bennett, PLLC

(57) ABSTRACT

The present invention relates to a method and an arrangement (102, 104, 106, 202, 302, 304, 502, 504, 702, 704, 1000, 1014) for prioritizing one of multiple cell-related mobility decisions associated with multiple parallel mobility events being triggered, comprising recognizing parameter settings associated with at least two parallel mobility events being triggered (steps 406, 604; 806), evaluating the parameter settings for determining which cell-related mobility decision to prioritize (steps 408; 606; 808), and performing a task according to the cell-related prioritized mobility decision (steps 410, 608; 814), to achieve a cell re-selection in idle mode or a hand over in connected mode. By applying multiple parameter settings a better performance is achieved as can be seen by a reduced percentage of time a User Equipment (102, 202, 302, 502, 702, 1000) is not connected to the best cell.

27 Claims, 6 Drawing Sheets

(56) References Cited

OTHER PUBLICATIONS

3RD Generation Partnership Project. 3GPP TS 36.331, V8.3.0 (Sep. 2008). 3rd Generation Partnership Project; Technical Specification Group Radio Access Network; Evolved Universal Terrestrial Radio Access (E-UTRA) Radio Resource Control (RRC); Protocol specification (Release 8), Sep. 2008.

3RD Generation Partnership Project. 3GPP TS 36.304, V8.3.0 (Sep. 2008). 3rd Generation Partnership Project; Technical Specification Group Radio Access Network; Evolved Universal Terrestrial Radio Access (E-UTRA); User Equipment (UE) procedures in idle mode (Release 8), Sep. 2008.

3RD Generation Partnership Project; Technical Specification Group Radio Access Network; Physical layer—Measurements (FDD), Sep. 2008, 3GPP TS 25.215 V8.2.0, (Release 8).

3RD Generation Partnership Project; Technical Specification Group Radio Access Network; Evolved Universal Terrestrial Radio Access (E-UTRA); Physical layer—Measurements, Sep. 2008, 3GPP TS 36.214 V8.4.0, (Release 8).

\* cited by examiner

METHOD AND ARRANGEMENT FOR SUPPORTING MULTIPLE SETTINGS OF MOBILITY TRIGGERS IN A TELECOMMUNICATIONS SYSTEM

TECHNICAL FIELD

The present invention relates to a method and arrangement in a telecommunications system, in particular it relates to a method and an arrangement for prioritizing a cell-related mobility decision associated with multiple parallel mobility events being triggered in a telecommunications system.

BACKGROUND

A User Equipment (UE) moving in a telecommunications network can be either in a Radio Resource Control (RRC) connected mode or in a RRC idle mode. In the case the UE is in the RRC connected mode, mobility of the UE is based on handover (HO), whereas in the case the UE is in the RRC idle mode, mobility of the UE is based on cell reselection.

Cell reselection is mainly a UE autonomous function and thus a function without the intervention of its serving cell. However, a UE in the RRC idle mode could still, at least to some extent, be controlled by broadcasted system parameters and a performance specification.

In contrast, for a UE in the RRC connected mode, handover (HO) is fully controlled by the network through explicit UE specific commands and by performance specification.

In both idle and connected modes, decisions related to the mobility have to be taken. These mobility decisions may be based on the same kind of downlink radio related measurements.

Both in Wideband Code Division Multiple Access (WCDMA) and Evolved-UMTS Terrestrial Radio Access Network (E-UTRAN), measurements related to neighbor cells are made for mobility purposes.

In the single carrier version of WCDMA system the following three downlink neighbor cell measurements are specified primarily for mobility purposes, 3GPP TS 25.215, "Physical layer-Measurements (FDD)":

Common Pilot Channel (CPICH) Reference Symbol Control Power (RSCP)

CPICH Ec/No=CPICH RSCP/Carrier Received Signal Strength Indicator (RSSI), and

UMTS Terrestrial Radio Access (UTRA) Carrier RSSI

The RSCP is measured by the UE on cell level basis on the Common Pilot Channel (CPICH), whereas the UTRA carrier RSSI is measured over the entire carrier. In this case it is the total received power and noise from all cells, including the serving cells, on the same carrier. The Ec/No is the received energy per antenna chip divided by the power density in the frequency band. If receiver diversity is not is use by the UE, the CPICH Ec/No is identical to CPICH RCSP/UTRA Carrier RSSI, according to the aforementioned relation. The above CPICH measurements are the main quantities used for the mobility decisions.

In the multi-carrier of WCDMA, these above mentioned measurements are done per carrier.

In E-UTRAN the following three downlink neighbor cell measurements are also specified primarily for mobility purposes, 3GPP TS 36.214, "Evolved UMTS Terrestrial Radio Access (E-UTRA); Physical layer—Measurements":

Reference Symbol Received Power (RSRP)

Carrier Received Signal Strength Indicator (RSSI).

Reference Symbol Received Quality (RSRQ)=RSRP/Carrier RSSI

The measurements of RSRP and RSCP are considered to be of Received Signal Strength (RSS) type. The measurements of Ec/No and RSRQ are considered to be of Received Signal Quality (RSQ) type.

A UE in connected mode may report measurements to the serving base station on the serving cell and neighbor cells continuously. These measurement reports would however produce a considerable signaling overhead. In order to reduce these signaling overheads, the UE can be configured to report one or more events being triggered in connected mode when certain conditions, as specified by parameter settings are met. The parameter settings can at least partially be provided by the serving base station. When for instance selection criteria, as specified by parameter settings, are fulfilled, the corresponding event is triggered, and the UE can thus report triggering of said event to the serving base station.

The reports of these triggered events are used by the serving base station to take mobility related decisions in connected mode; i.e., to instruct the UE to perform handover to a designated by the reports better cell.

Furthermore, triggering of an event can be based on fulfillment of signal strength measurement criteria, for instance, criteria on RSRP or based on fulfillment of signal quality measurement criteria, for instance, criteria on RSRQ, or both, as configured by the network.

In addition, the criteria for triggering of an event may be absolute based on a single cell. Alternatively, the criteria for triggering of an event may be relative based on a comparison between 2 or more cells, generally being between the serving cell and the strongest neighbor cells.

Typically one or more parameter settings specifying said events are configured, and associated thresholds or other parameters, can be signaled by a serving base station to a UE.

Parameter settings specifying such events are specified in WCDMA and E-UTRAN systems.

In the case of a UE in idle mode, a singular setting can be used for evaluation whether cell reselection criteria are fulfilled or not. The concept of providing multiple settings, as such, for idle mode mobility is known.

In the case of a UE in connected mode, the network may provide multiple parameters settings for evaluation of whether an event is being triggered or not, that is whether or nor the handover related criteria are fulfilled or not.

When the UE reports triggering of events corresponding to one and the same target cell, the UE is typically instructed to perform a handover (HO) to said cell.

In the case when the UE reports triggering of events corresponding to different target cells, it has not yet been clarified to which target cell to perform the handover.

In case different target cell specific parameter settings would fulfill cell reselection or handover criteria, an unspecified behavior or both the UE and the network, would degrade the system performance.

There is thus a need for an improved method and arrangement for handling the scenario of fulfillment of multiple cell-related parallel events being triggered.

SUMMARY

It is an object of the present invention to provide prioritizing one out of a multiple cell-related mobility decisions associated with multiple parallel mobility events being triggered, which at least to a certain extent alleviates the problem of risking degrading an overall system performance.

According to an aspect of the present invention, there is provided a method in a network node for prioritizing one of multiple cell-related mobility decisions associated with multiple parallel mobility events being triggered. The method comprises recognizing parameter settings associated with at least two parallel mobility events being triggered, evaluating the parameter settings for determining which cell-related mobility decision to prioritize, and performing a task according to the cell-related prioritized mobility decision.

The step of recognizing of the method may further comprise identifying the parameter settings associated with at least two parallel mobility events being triggered.

The step of recognizing of the method may further comprise receiving the parameter settings associated with at least two parallel mobility events being triggered.

The method may further comprise receiving cell selection criteria from at least one base station, for measuring cell signals and identifying mobility events being triggered.

The method may further comprise signaling cell selection criteria from a base station, for measuring cell signals and identifying mobility events being triggered.

The method may further comprise identifying at least two mobility events being triggered in parallel, when being triggered within certain time duration.

The step of evaluating the parameter settings within the method may further comprise one of: comparing hysteresis values of measured cell signals related to the parameter settings associated with each parallel mobility event being triggered, being followed by prioritizing a cell-related mobility decision, the triggered event of which has the highest hysteresis value, and determining that a majority of the parallel mobility events being triggered relates to the same cell, and prioritizing a mobility decision relating to said cell.

The highest hysteresis value of the step of comparing within the step of evaluating in the method, may comprise that the highest hysteresis value relates to a first cell, and the majority of triggered parallel events within the step of determining in the step of evaluating in the method, may comprise that the majority of triggered parallel events relates to a second cell, and that the method further comprises prioritizing a mobility decision being associated with the second cell.

The step of evaluating of the method may comprise determining whether the two highest numbers of parallel events being triggered are equal and relate to different cells, and prioritizing a mobility decision relating to the cell, which is associated with the highest hysteresis value of the measured cell signals.

The method for which the network node is a UE, may further comprise reporting a prioritized cell-related mobility decision to a base station.

Performing a task according to the prioritized cell-related mobility decision within the method for which the network node is a UE, may comprise performing cell reselection according to the prioritized mobility decision.

Performing a task according to the prioritized cell-related mobility decision within the method for which the network node is a UE, may comprise obtaining an instruction from a base station to perform handover to the cell according to the prioritized mobility decision and to perform said handover.

Performing a task according to the prioritized cell-related mobility decision within the method for which the network node is base station, may comprise instructing a UE to perform handover to the cell to which the prioritized mobility decision relates.

The method in which a mobility event may be triggered when a target cell signal is stronger than a corresponding signal received from a serving cell over a certain time.

The method in which a mobility event may be triggered when a target cell signal is stronger by a hysteresis margin over a corresponding signal received from a serving cell.

According to another aspect of the present invention, there is provided a network node configured to prioritize one of multiple cell-related mobility decisions associated with multiple parallel mobility events being triggered. The network node comprises a recognizing unit configured to recognize parameter settings associated with at least two parallel mobility events being triggered. The network node also comprises an evaluating unit, configured to be connected to the recognizing unit and configured to evaluate the parameter settings for determining which cell-related mobility decision to prioritize, and to perform a task according to the prioritized cell-related mobility decision.

The recognizing unit of the network node being a UE configured to communicate with at least one base station in a telecommunications system, may further comprise an identification unit configured to identify the parameter settings associated with at least two parallel mobility events being triggered.

The recognizing unit of the network node being a base station, may further comprise a transceiving unit configured to receive the parameter settings associated with at least two parallel mobility events being triggered.

The transceiving unit in the network node being a base station, may further be configured to signal cell selection criteria, for measuring cell signals and identifying mobility events being triggered.

The identification unit of the network node being a UE, may further be configured to identify cell selection criteria from at least one base station, for measuring cell signals and identifying mobility events being triggered.

The identification unit of the network node being a UE, may further be configured to identify at least two mobility events as being triggered in parallel, when being triggered within certain time duration.

The evaluating unit of the network node may further comprise a comparing unit and a processing unit, wherein the comparing unit may be configured to compare hysteresis values of measured cell signals associated with each parallel mobility event being triggered, and to prioritize a cell-related mobility decision, the triggered event of which has the highest hysteresis value. The processing unit may be configured to determine whether a majority of the parallel mobility events relates to the same cell, and prioritize a mobility decision relating to said cell if a majority of the parallel mobility events relate to the same cell.

The comparing unit of the evaluating unit of the network node may further be configured to determine that the highest hysteresis value relates to a first cell, and wherein the processing unit is configured to determine that the majority of triggered parallel events of the processing unit relates to a second cell, the processing unit further being configured to prioritize a mobility decision being associated with the second cell.

The processing unit of the evaluating unit of the network node may further be configured to determine whether the two highest numbers of parallel events being triggered are equal and relate to different cells, and wherein the comparing unit is configured to determine which cell the highest hysteresis relates to, the processing unit further being configured to use hysteresis data from the comparing unit and to prioritize a mobility decision relating to the cell that relates to the highest hysteresis value of the measured cell signals.

The processing unit in the network node being a UE, may further be configured to report a prioritized cell-related mobility decision to a base station.

The processing unit in the network node being a UE, may further be configured to perform a cell reselection or to obtain an instruction from a base station to perform handover to the cell to which the prioritized mobility decision relates.

The processing unit in the network node being a base station, may further be configured to instruct a UE to perform handover to the cell to which the prioritized mobility decision relates.

The expression "majority" of parallel mobility events being triggered is herein understood as "majority or highest number" of parallel mobility events being triggered.

Among the advantages with embodiments of the present invention can be mentioned:
Better mobility management performance
Important mobility management performance measure being the percentage of time a terminal is connected or camped to the best cell, can be increased
Improved quality of service perceived by the users
Achieving more efficient uplink radio resource utilization due to reduced signaling
Target cell selection based on the highest hysteresis is advantageous; the Received Signal Strength (RSS) may then have its highest value

BRIEF DESCRIPTION OF DRAWINGS

In order to explain advantages and features of the present invention herein in more detail a few embodiments will be described below, where references are made to the accompanying drawings, for which

ABBREVIATIONS/DEFINITIONS

Figure 1:
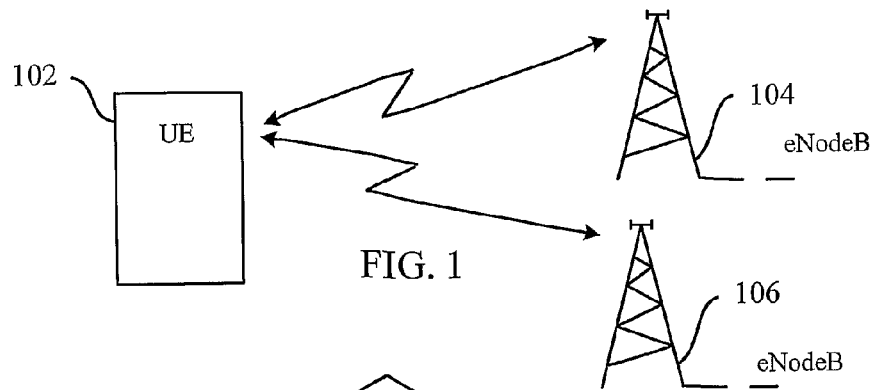
FIG. 1 illustrates communicating network nodes of a wireless communication system.

3GPP 3$^{rd}$ Generation Partnership Project
CPICH Common Pilot Channel
DL Downlink
Ec/No Received energy per antenna chip divided by power density in frequency band
E-UTRAN Evolution UMTS Terrestrial Radio Access Network
FDD Frequency Division Duplex
HO HandOver
LTE Long Term Evolution
RRC Radio Resource Control
RSQ Received Signal Quality
RSRP Reference Symbol Received Power
RSRQ Reference Symbol Received Quality
RSS Received Signal Strength
RSSI Received Signal Strength Indicator
UE User Equipment
UL Uplink
UMTS Universal Mobile Telecommunications System
WCDMA Wideband Code Division Multiple Access

DETAILED DESCRIPTION

Mobility management is an important radio network mechanism, especially for a moving mobile over an area covering a plurality of cells. Two major mobility management mechanisms can be identified as handover and cell reselection. Handover is applicable for terminals, for instance User Equipments, UEs, being in the Radio Resource Control (RRC) connected mode, whereas cell reselection is applicable for UEs in the RRC idle mode.

The existence of handover and cell reselection has an important impact on network performance and on the user perceived quality of service.

The performance of handover and cell reselection is dictated by parameter settings specifying parameter criteria for selection of a target cell. By meeting the parameter criteria an event corresponding to the parameter criteria will be triggered.

The triggering of events is of high importance for the performance of handover and cell reselection. An event can for instance be triggered when the Received Signal Strength (RSS) from the target cell is stronger than that from the serving cell by a certain hysteresis margin over a certain time. The parameter criteria can alternatively depend on the Radio Signal Quality (RSQ), in which case another event can be triggered when the RSQ from the target cell is stronger than that from the serving cell by a certain hysteresis margin over a certain time.

As mentioned above, in the case of Long Term Evolution (LTE) the RSQ corresponds to the Reference Symbol Received Quality (RSRQ).

Events can thus be triggered by the fulfillment of parameter criteria. Down below it will be described how the triggering of events can result in a mobility decision taken by a network node.

It should be mentioned that the existence of hysteresis parameters can provide stability to the triggering of events and therefore stability to the mobility decision concerning handover and cell reselection. An appropriate setting of the hysteresis parameters can avoid or at least minimize a repeated on- and off-switching of a function, the so-called ping-pong effect, or unnecessarily triggering of corresponding events and following mobility decisions in the form of cell reselections or handovers.

The triggers for handover and cell reselection are named differently depending on the cellular system. Within this technical field the triggers are identified as HandOver (HO) hysteresis, HO margin, and Time To Trigger, (TTT) for a UE being in the RRC connected mode. The HO hysteresis and the HO margin are signal thresholds for a received signal strength. These thresholds need to be reached in order to trigger and to perform a handover. The TTT parameter is a time duration parameter during which a signal strength criterion has to be met in order to trigger the corresponding event and to perform the handover (HO). For a UE in the RRC idle mode, the corresponding radio related parameters can be identified as Q hysteresis and Treselection. Q hysteresis is the corresponding signal strength margin that needs to be reached in order to trigger the event and to perform a cell reselection, whereas the Treselection is the time duration parameter during which a signal strength has to meet a signal strength criteria.

Since the triggers play an important role on the mobility management mechanisms, optimization methods for the trigger related parameters can be proposed. One of them is the parallel use of more than one parameter setting specifying the criteria for triggering of an event, so as to capture different types of RSS variations, and/or RSQ variations, which can be observed in a cellular system.

Simultaneous or Multiple Triggering

In the presence of two or more parameter settings specifying the criteria for triggering of events, more than one of the parameter settings can produce triggering of events at certain instances. Simultaneous triggering or multiple triggering of events during a certain time period associated with cell reselection or handover can thus occur. In the case the different events associated with the parameter settings being activated indicate the same target cell, the mobility decision to perform will be to select the target cell as the new serving cell. However, a situation may arise where the multiple triggering of events are associated with different target cells. In such a situation the controlling network node needs clear instructions, not to put the performance at risk.

At least some embodiments of the present invention therefore relate to ways to prioritize a cell-related mobility decision based on parameter settings, in a system configured with a plurality of parameter settings of which more than one cause triggering of an event by the fulfillment of cell selection criteria, as in the case of cell reselection or handover.

Briefly described, the present invention concerns a method and an arrangement for prioritizing one of a plurality of available mobility decisions in a network node of a telecommunications system.

In more detail, the invention comprises a method and an arrangement in a wireless communication system configured to support multiple parameter settings for prioritizing one out of several available mobility decisions relating to a plurality of mobility events being triggered in parallel for a User Equipment (UE).

FIG. 1 illustrates three network nodes of a wireless telecommunication system, in the form of one User Equipment, UE 102 and two base stations, as exemplified by enhanced Node-B or eNB 104 and 106.

Figure 2:
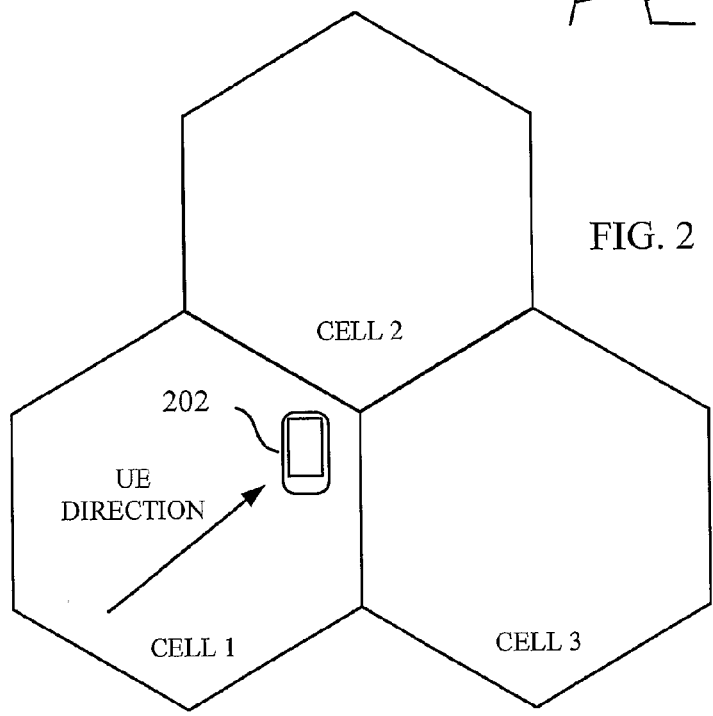
FIG. 2 illustrates a moving UE in a cell plan of a communications system according to one scenario of the present invention.

With reference to FIG. 2, illustrating a UE 202 moving within a cellular plan comprising a plurality of cells, at least some embodiments of the present invention will be discussed in more detail.

As mentioned above, in the case a plurality of events are triggered in parallel and for which the triggered events relate to different cells, a problem occurs regarding which mobility decision to prioritize. According to at least some embodiments of the present invention, in the case of multiple mobility events being triggered during a time duration T, prioritizing of available mobility decisions is performed according to methods as described below.

FIG. 2 presents the UE 202 moving within CELL 1, which is the serving cell. UE 202 is moreover moving in a direction towards an area in close proximity to both CELL 2 and CELL 3.

If the UE were moving in a direction towards a singular cell only, for instance CELL 2, a mobility decision would be taken at a point in time when measured parameters of CELL 2 fulfill a selection criteria, possibly in relation to measured parameters related to CELL 1. At the time the criteria of CELL 2 are met, the mobility event is triggered and a decision to perform a handover or a cell reselection can be performed. Whether a handover or a cell reselection is performed depends of course on the RRC mode of the UE, being either RRC connected or RRC idle, respectively.

When the UE 202 is moving is a direction towards a region in which multiple events can be triggered within a time duration, the UE or the base station needs further input in order to make a decision not to risk the performance of the wireless communication system. If for instance the parameter setting for CELL 2 and the parameter setting for CELL 3 are fulfilled during certain time duration, for instance the Time To Trigger (TTT), multiple events are triggered in parallel. Triggering of multiple events in parallel requires an evaluation of the parameter settings and the triggered events to decide which mobility decision to prioritize.

The UE 202 here communicates with the base station of CELL 1 and the base station of CELL 2. FIG. 1 can illustrate this case where the UE 102 communicates with the eNodeB 104 and the eNodeB 106.

A mobility decision can be prioritized based on for instance the highest hysteresis value of a target cell out of a number parameter set-specific hysteresis values of neighboring cells. Another way to prioritize a decision may be to prioritize a decision relating to a certain cell, to which a majority of the triggered events relate.

In the following a general presentation of the method for prioritizing one of multiple cell-related mobility decisions associated with multiple parallel mobility events being triggered and a network node configured to prioritize one of multiple cell-related mobility decisions associated with multiple parallel mobility events being triggered, will be given. Thereafter specific presentations according to various embodiments of the present invention will be given.

The general method to be performed by a network node such as a enhanced NodeB or User Equipment (UE) comprises recognizing parameter settings associated with at least two parallel mobility events being triggered, evaluating the parameter settings for determining which cell-related mobility decision to prioritize, and performing a task according to the cell-related prioritized mobility decision.

The step of evaluating in the general method for prioritizing one of multiple cell-related mobility decisions associated with multiple parallel mobility events being triggered, also comprises one of comparing hysteresis values of measured cell signals related to the parameter settings associated with each parallel mobility event being triggered, and prioritizing a cell-related mobility decision, the triggered event of which has the highest hysteresis value, and determining that a majority of the parallel mobility events being triggered relates to the same cell, and prioritizing a mobility decision relating to said cell.

Figures 10A, 10B:
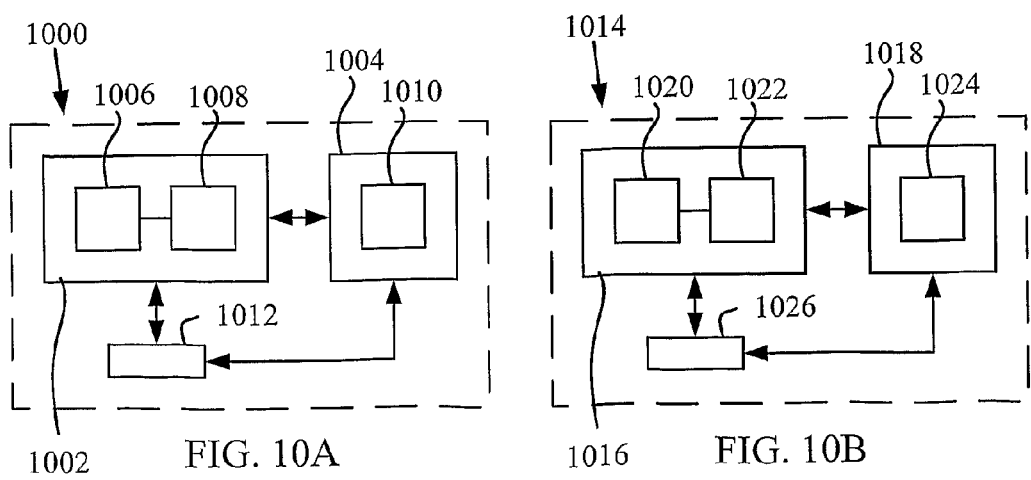
FIGS. 10A and 10B illustrate network nodes according to some embodiments of the present invention.

The general network node will now be presented while referring to FIGS. 10A and 10B. The general network node 1000, 1014 is configured to prioritize one of multiple cell-related mobility decisions associated with multiple parallel mobility events being triggered. The network node is also configured to be connected in a telecommunications system, and comprises a recognizing unit 1004, 1018 configured to recognize parameter settings associated with at least two parallel mobility events that are being triggered. The network node also comprises an evaluating unit 1002, 1016 that is configured to be connected to the recognizing unit and to evaluate the parameter settings for determining which cell-related mobility decision to prioritize. In addition, the evaluating unit 1002, 1016 is also configured to perform a task according to the prioritized cell-related mobility decision.

The evaluating unit 1002, 1016 of the general network node 1000, 1014 comprises further a comparing unit 1008, 1022 and a processing unit 1006 1020, where the comparing unit 1008, 1022 is configured to compare hysteresis values of measured cell signals associated with each parallel mobility event that is being triggered. The comparing unit 1008, 1022 is also configured to prioritize a cell-related mobility decision, the triggered event of which has the highest hysteresis value. The processing unit 1006, 1020 is configured to determine whether a majority of the parallel mobility events relates to the same cell, and to prioritize a mobility decision relating to said cell if a majority of the parallel mobility events relates to the said same cell.

The specific presentations according to various embodiments of the present invention will now be given.

Target Cell Reselection in Idle Mode

As mentioned above, the mobility functionality for a UE in idle RRC mode is cell reselection.

Figure 3:
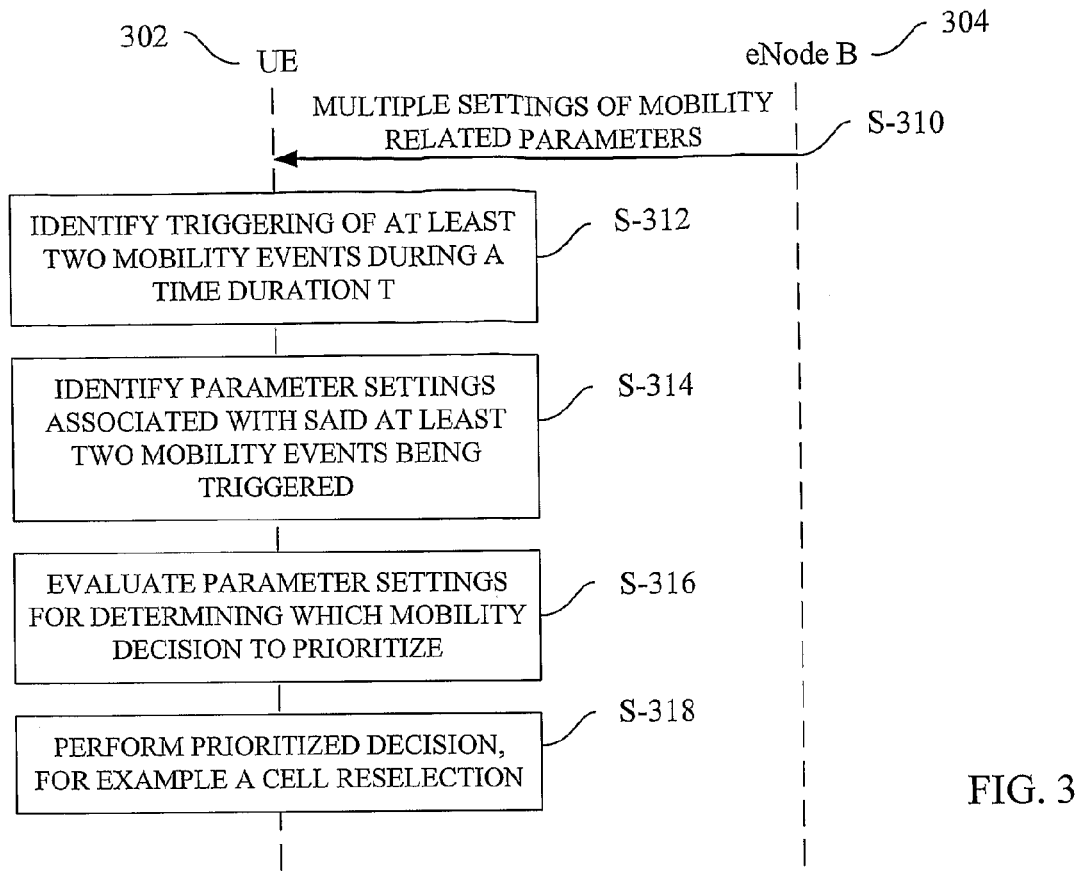
FIGS. 3, 5, and 7 illustrate basic signaling schemes according to some embodiments of the present invention.

With reference to FIG. 3 illustrating a signaling scheme between a UE 302 in the idle RRC mode and an eNB 304, a few embodiments of the present invention are presented.

Since cell reselection is a function with only limited assistance by the UEs serving cell, a few steps can be taken by the UE itself.

Multiple settings of mobility related parameters can be transmitted by one or more base stations, here being illustrated by the single eNodeB 304, to be received by the UE 302, as indicated by signaling step S-310.

With reference to FIG. 1, eNodeB 104 and eNodeB 106 could for instance transmit mobility related parameters to the UE 102.

Having access to mobility related parameter settings such as Q hysteresis and Treselection together with radio parameters that are being measured by the UE, the UE can identify whether various parameter criteria are met or not.

The parameter Q hysteresis is a signal strength threshold parameter, whereas the Treselection parameter is a time duration parameter, during which certain criterion has to be fulfilled, for instance that the signal strength from a target base station is stronger than the signal strength from the serving base station.

While the Q hysteresis and Treselection relate to cell reselection mechanism, the parameters HO hysteresis, HO margin and TTT relate to the handover mechanism The parameter settings as received here accordingly define the criteria that have to be met to trigger the corresponding cell reselection event.

In signaling step S-312, the UE 302 identifies the triggering of at least two mobility events during T.

In signaling step S-314, the parameter settings of the triggered mobility events are identified by the UE 302, through which the UE can identify the parameter settings that define the parameter criteria. Having knowledge about the identified parameter settings defining the criteria, the UE 302 can evaluate the identified parameter settings in order to determine which cell-related mobility decision to prioritize, in signaling step S-316.

In signaling step S-316, the UE is thus determining which mobility decision to take, without risking deteriorating the radio performance of the telecommunications system. In this evaluation of parameter settings, various predefined rules can be used to prioritize one out of a plurality of possible mobility decisions.

For instance, a mobility decision for which the triggering of the event comprised the highest hysteresis value, can be prioritized, according to some embodiments of the present invention.

Alternatively, a mobility decision of cell reselection of a target cell can be prioritized when the majority of the triggered mobility events relate to the same target cell. Having decided which mobility decision to prioritize in signaling step S-316, the UE can now perform said prioritized mobility decision in signaling step S-318, by performing a cell reselection of a certain target cell, by which measure the best possible performance may be guaranteed for a UE 302 in idle mode.

Figure 4:
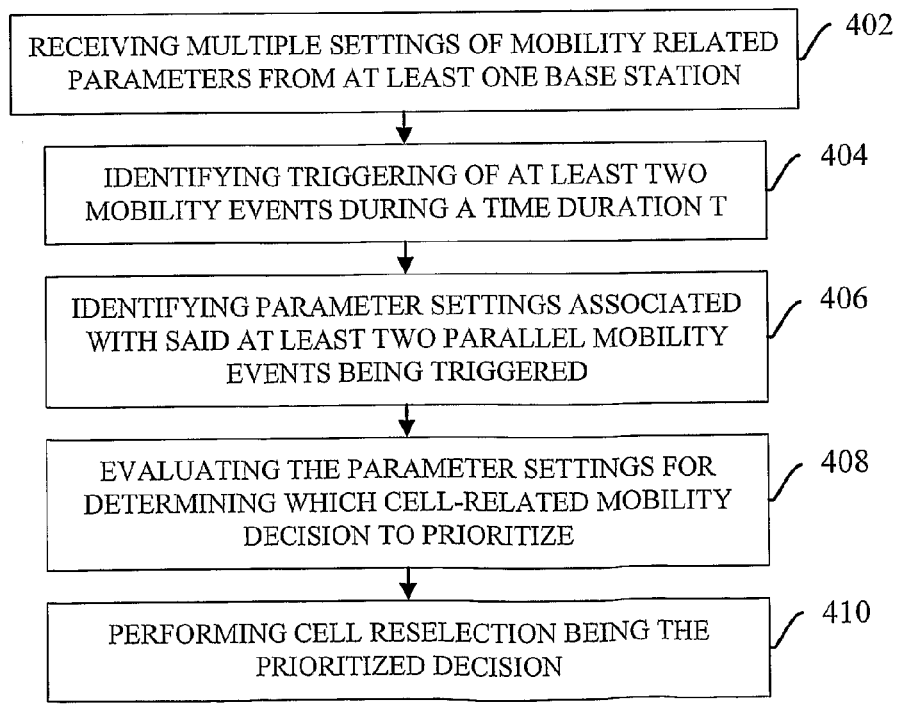
FIGS. 4, 6, and 8 illustrate flow-charts of method steps according to some embodiments of the present invention.

With reference to FIGS. 4 and 10A illustrating a flow-chart of method steps and a User Equipment, respectively, the corresponding method steps of target cell reselection for a UE in idle mode will be presented in some detail.

The general network node thus now refers to a User Equipment 1000, as presented in FIG. 10A. The UE 1000 is thus configured to prioritize one of multiple cell-related mobility decisions associated with multiple parallel mobility events being triggered, where the UE is configured to be connected in a telecommunications system. The UE comprises a recognizing unit 1004 that is configured to recognize parameter settings associated with at least two parallel mobility events being triggered, and an evaluating unit 1002, configured to be connected to the recognizing unit 1004 and configured to evaluate the parameter settings for determining which cell-related mobility decision to prioritize as well as to perform a task according to the prioritized cell-related mobility decision.

The evaluating unit 1002 of the UE 1000 may further comprise a comparing unit 1008 and a processing unit 1006. The comparing unit 1008 is configured to compare hysteresis values of measured cell signals associated with each parallel mobility event being triggered, and to prioritize a cell-related mobility decision, the triggered event of which has the highest hysteresis value. The processing unit 1006 is configured to determine whether a majority of the parallel mobility events relates to the same cell, and prioritize a mobility decision relating to said cell if a majority of the parallel mobility events relate to the same cell.

The UE 302 may thus receive multiple settings of mobility related parameters from one or more base stations, being schematically illustrated by eNodeB 304, according to step 402. This step of identifying multiple settings of mobility related parameters, that is parameters defining the cell selection criteria, from one or more base stations, for measuring cell signals and identifying mobility events that are being triggered can be performed by the identification unit 1010 of the recognizing unit 1004.

With access to the parameter settings together with radio parameters as measured by the UE 302, the UE can then identify triggering of a plurality, or at least two or more, mobility events during a time duration T, in step 404. Identifying at least two mobility events that are triggered in parallel within certain time duration is carried out by the identification unit 1010.

In step 404, the UE can thus identify that events are being triggered, whereas the UE in step 406 can identify the parameter settings that are associated with said at least two mobility events being triggered in parallel. The two mobility events that are triggered can for instance relate to CELL 2 and CELL 3, as indicated in FIG. 2. The identification unit 1010 of the recognizing unit 1004 is moreover configured to perform method step 406.

Further, in step 408 the UE may thus evaluate the parameter settings for determining which mobility decision to prioritize, as mentioned above in relation to signaling step S-316. This step of evaluating the parameter settings can be carried out by the evaluating unit 1002.

The step of evaluating the parameter settings, step 408 in general comprises comparing hysteresis values of measured cell signals related to the parameter settings associated with each parallel mobility event that is triggered, and prioritizing a cell-related mobility decision, the triggered event of which has the highest hysteresis value. Step 408 may alternatively comprise determining that a majority of the parallel mobility events being triggered relates to the same cell, and prioritizing a mobility decision relating to said cell. Comparing hysteresis values of measured cell signals can be carried out by the comparing unit 1008, whereas determining that a majority of the parallel mobility events that are triggered relates to the same cell, followed by prioritizing a mobility decision relating to said cell can be carried out by the processing unit 1006 of the evaluating unit 1002.

A cell-related mobility decision is thus either prioritized based on the highest measured hysteresis value or based on that a majority of the triggered events relate to the same target cell, according to some embodiments of the present invention.

Also, the determination of which mobility decision to prioritize could alternatively be based on a majority rule when more than two parameter settings are used and the majority of the parameter events being triggered correspond to the same target cell. When a majority of parameter criteria are met for a plurality of mobility events for the same cell, then UE can prioritize performing a mobility decision related to this cell. This cell can thus be selected as a target cell for cell reselection. Parameter criteria of a mobility event related to this cell are thus met based on a majority of parameter settings, according to some embodiments of the present invention.

When determining whether a majority of the parallel mobility events relate to the same cell, it can be determined the number of events being triggered in parallel, and for each of the triggered events the respective target cell can be noted. By analyzing all events that are triggered in parallel, it is revealed whether a majority of the analyzed events relate to a one particular cell, or not. If they do, prioritizing a cell reselection of this particular cell will be performed.

Also, it can also be determined that the highest hysteresis value relates to a first cell, and that the majority of triggered parallel events relates to a second cell. In this case, the prioritized mobility decision may be the decision that is associated with the second cell.

The comparing unit may here be configured to determine that the highest hysteresis value relates to a first cell, and the processing unit may here be configured to determine that the majority of triggered parallel events of the processing unit relates to a second cell. The processing unit may further be configured to prioritize a mobility decision being associated with the second cell. The cell to which the majority of the triggered parallel events relate may thus be prioritized over the cell that relates to the highest hysteresis value.

When determining the majority or the highest number of parallel events being triggered it can be revealed that the two highest numbers of parallel triggered events that relate to different cells are equal. The mobility decision to prioritize in this case can be the mobility decision relating to the cell that is associated with the highest hysteresis value of the measured cell signals among said different cells.

The processing unit may here be configured to determine whether the two highest numbers of parallel events being triggered are equal and relate to different cells, and the comparing unit may be configured to determine which cell the highest hysteresis relates to. Moreover, the processing unit may further be configured to use hysteresis data from the comparing unit and to prioritize a mobility decision relating to the cell that relates to the highest hysteresis value of the measured cell signals.

Having decided which decision to prioritize, the idle mode UE can then perform a task according to the cell-related prioritized mobility decision. Cell reselection to a particular cell according to the prioritized decision is thus performed in step 410. Performing this task can be executed by the processing unit 1006. The method steps of FIG. 4 and where they can be executed have thus been described.

It can be clarified that the mobility related parameter settings may comprise a hysteresis parameter and the Treselection parameter. The hysteresis parameter may be defined as a parameter margin for a measured signal strength quantity, which when in use typically adds an additional term to the parameter criteria corresponding to the hysteresis value. This additional term has also to be met to fulfill the criteria for triggering the corresponding event. In other words, the measured signal strength also needs to fulfill the hysteresis criteria including the hysteresis parameter.

The Treselection parameter however, is a time delay parameter that delays the triggering of a cell reselection event a duration that equals to the value of the Treselection parameter. By applying a proper hysteresis value on parameters settings, the so called ping-pong effect can effectively be minimized. Application of Treselection assists in taking more robust mobility decisions, which increases the overall performance of the wireless communication system comprising the moving UE in a cell plane with several cells. It can be repeated that the mobility related parameters are defined by the network and sent by the eNodeB to the UE.

As mentioned above and as will be described in more detail below, the hysteresis parameter can play an important role in prioritizing one out of a plurality of mobility events being triggered in parallel. When two or more mobility events are triggered in parallel, the decision for which the hysteresis value is the highest, can be prioritized according to some embodiments of the present invention.

Also, as mentioned above, the cell reselection can be autonomously performed by the UE after having received network controlled parameters from an eNodeB.

Target Cell Selection for Handover (HO) in Connected Mode

Having described a method and a network node in the form of a UE in idle mode, a method and a network node in the form of an eNB will be described below, while the UE is in the connected mode.

Figure 5:
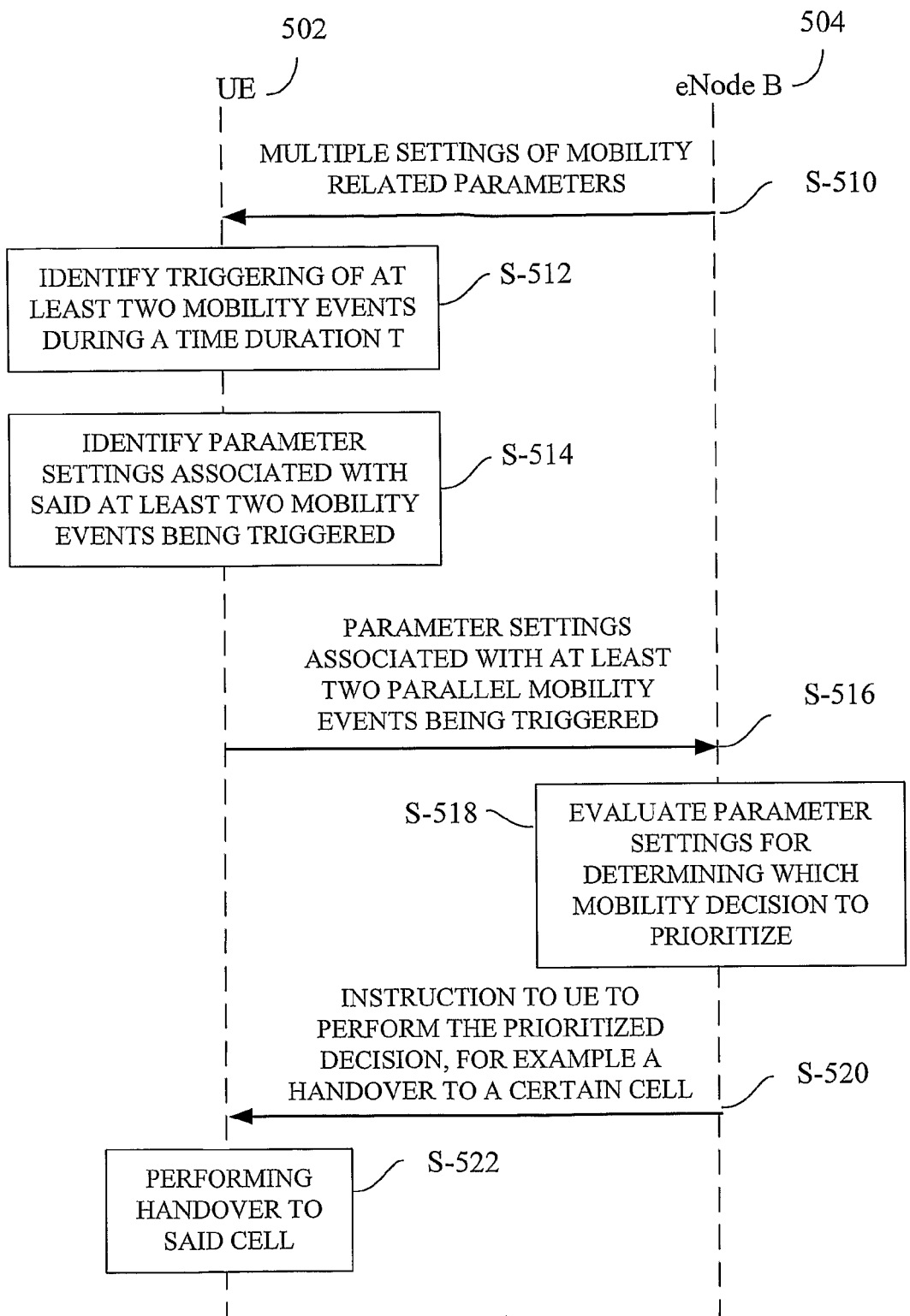

FIG. 5 illustrates a signaling scheme between a UE 502 in connected mode and an eNodeB 504, for a prioritizing one of multiple mobility decisions relating to mobility events being triggered in parallel. With reference to this figure some embodiment of the present invention will now be described.

Similar to the signaling scheme in FIG. 3, for a UE in idle mode, the eNB 504 can signal multiple settings of mobility related parameters in signaling step S-510 to the UE 502. Moreover, the following signaling steps S-512 and S-514 also correspond to the signaling steps of S-312 and S-314, as indicated in FIG. 3, for which reason reference to said previous steps are also made.

However, in contrast to the embodiments for a UE in idle mode and as indicated in FIG. 3, the embodiments of the present invention for a UE in connected mode comprises a signaling step of receiving parameter settings in signaling step S-516 associated with at least two parallel mobility events being triggered, by the eNB 504 as reported by the UE 502.

It should be clarified that whereas one or more eNodeBs may transmit parameter settings to the UE 502 in signaling step S-510, only one eNodeB, typically the serving eNodeB 504, receives the parameter settings associated with at least two parallel mobility events being triggered, in signaling step S-516.

The eNB 504 can thus receive the parameter settings that are associated with the mobility events that are being triggered in parallel, from the UE 502 that has performed measurements of radio parameters. Example of radio parameters are Reference Symbol Received Power (RSRP), Carrier Received Signal Strength Indicator (RSSI) and Reference Symbol Received Quality (RSRQ), wherein RSRQ=RSRP/Carrier RSSI.

Having received the parameter settings by the eNodeB in signaling step S-516, the eNodeB may thus evaluate said received parameter settings for determining which mobility decision to prioritize, in signaling step S-518.

So as to determine which mobility decision to prioritize the eNB can use the mobility related parameter settings such as HO hysteresis, HO margin, and Time To Trigger (TTT), to which the eNB has access, together with radio parameters that were measured by the UE.

The parameters HO hysteresis and HO margin, are signal strength threshold parameters, whereas the TTT parameter is a time duration parameter, during which a certain criteria has to be fulfilled.

Various ways to prioritize one out of several mobility events that are triggered in parallel can be applied, of which a few were described in relation to signaling step S-316 of FIG. 3.

Having determined which mobility decision to prioritize in signaling step S-518, an instruction to perform a prioritized mobility decision for the UE in connected mode is sent to the UE 502 from the eNodeB 504 in signaling step S-520. After receipt of the instruction the UE 502 may then perform handover to said cell, in signaling step S-522, according to the prioritized decision as determined by the eNodeB in signaling step S-518.

Prioritizing a mobility decision may be performed based on the highest hysteresis value or based on which cell the majority of mobility events being triggered relate to, as described previously in relation to step 408. In case these two different criteria indicate different target cells, the UE may be handed over to the cell which is indicated by the highest number of mobility triggers.

The hysteresis parameter may play an important role in some embodiments or the present invention. In the connected mode, the time delay exists under the name Time To Trigger (TTT), which together with other parameter settings define under which circumstances to identify the triggering of an event.

Figure 6:
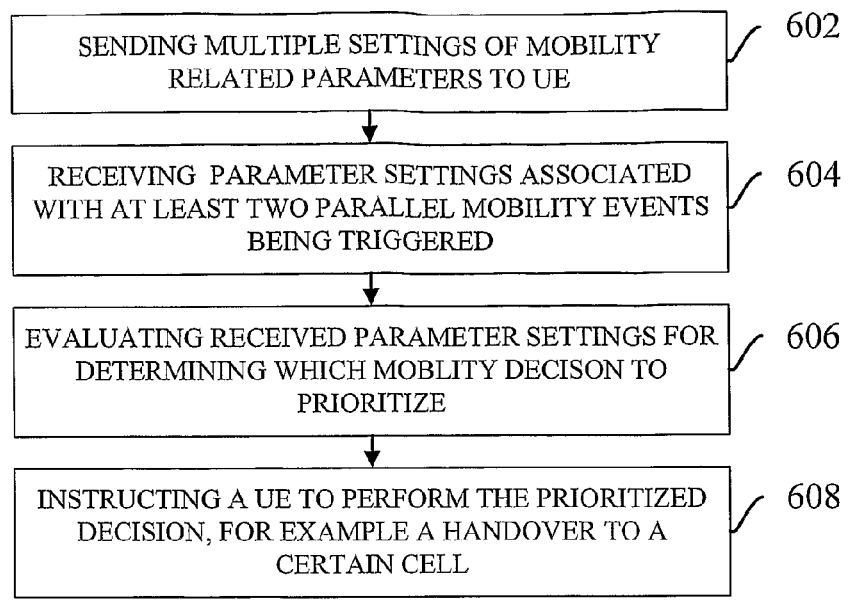

FIG. 6 illustrating a flow-chart of method steps in an eNodeB will be described with reference to some of the signaling steps in the signaling scheme of FIG. 5. Since the method steps of FIG. 6 are to be performed by at least one base station, reference will also be given FIG. 10B illustrating a network node in the form of a base station.

The method for prioritizing one of multiple cell-related mobility decisions associated with multiple parallel mobility events that are being triggered, to be performed by a network node such as a enhanced NodeB comprises recognizing parameter settings associated with at least two parallel mobility events being triggered, evaluating the parameter settings for determining which cell-related mobility decision to prioritize, and performing a task according to the cell-related prioritized mobility decision.

Evaluating also comprises one of comparing hysteresis values of measured cell signals related to the parameter settings associated with each parallel mobility event being triggered, and prioritizing a cell-related mobility decision, the triggered event of which has the highest hysteresis value, and determining that a majority of the parallel mobility events being triggered relates to the same cell, and prioritizing a mobility decision relating to said cell.

The network node thus now refers to an eNodeB 1014, as presented in FIG. 10B. The eNB 1014 is thus configured to prioritize one of multiple cell-related mobility decisions associated with multiple parallel mobility events being triggered, where the eNB is configured to be connected in a telecommunications system. The eNB comprises a recognizing unit 1018 that is configured to recognize parameter settings associated with at least two parallel mobility events being triggered, and an evaluating unit 1016, configured to be connected to the recognizing unit 1018 and configured to evaluate the parameter settings for determining which cell-related mobility decision to prioritize as well as to perform a task according to the prioritized cell-related mobility decision.

The evaluating unit 1016 of the eNB 1014 may further comprise a comparing unit 1022 and a processing unit 1020. The comparing unit 1022 is configured to compare hysteresis values of measured cell signals associated with each parallel mobility event being triggered, and to prioritize a cell-related mobility decision, the triggered event of which has the highest hysteresis value. The processing unit 1020 is configured to determine whether a majority of the parallel mobility events relates to the same cell, and prioritize a mobility decision relating to said cell if a majority of the parallel mobility events relate to the same cell.

The method can start by the step of sending multiple settings of mobility related parameters to a UE, for instance the UE 502, in step 602. It is the transceiving unit 1024 of the recognizing unit 1018 that is configured to perform step 602.

After the UE subsequently has identified triggering of parallel mobility events and identifying of the parameters settings, the eNodeB can then in step 604 receive the parameter settings associated with at least two parallel mobility events being triggered. The step of receiving said parameter settings associated with at least two parallel mobility events that are triggered can also be performed by the transceiving unit 1024.

The step of evaluating the received parameter settings for determining which mobility related decision to prioritize can now be performed by the eNodeB in step 606.

The step of evaluating is performed by the evaluating unit 1016 of the eNB 1014. More precisely, the comparing unit 1022 of the evaluating unit 1016 is configured to compare hysteresis values of measured cell signals associated with each parallel mobility event that is triggered, and to prioritize a cell-related mobility decision, the triggered event of which has the highest hysteresis value. Moreover, the evaluating unit 1016 is also configured to determine whether a majority of the parallel mobility events that are triggered relates to the same cell, and prioritizing a mobility decision relating to said cell. This determination may be performed in a way similar to that described under step 408 above.

Having determined the prioritized decision, the eNodeB can then instruct a UE to perform the prioritized decision, in step 608, which is this case could be a handover to a certain cell.

It is the processing unit 1020 of the evaluating unit 1016 which is configured to perform a task according to the prioritized cell-related mobility decision. In this case of the UE being in connected mode, the task is to instruct the UE to perform handover to the cell to which the prioritized handover decision relates.

As mentioned above, the prioritizing of a mobility decision can be based on the majority of the detected triggering events when more than 2 parameter settings are used and the majority of the reported events correspond to the same target cell.

When the majority of parameter criteria are met for the same cell, the network can thus select this target cell, being the cell which has fulfilled the event criteria corresponding to majority of the parameter settings.

UE Behavior for Multiple Triggers in Connected Mode

In a scenario in which a UE is in the connected mode and reports parameter settings associated with at least two parallel mobility events being triggered to the eNodeB, the uplink signaling load increases. In case multiple parameter settings for mobility related events are used and if the reported parameter settings associated with triggered mobility events correspond to different target cells, then it could be specified that the UE reports only a singular parameter setting associated with a prioritized mobility event, to the eNodeB.

Figure 7:
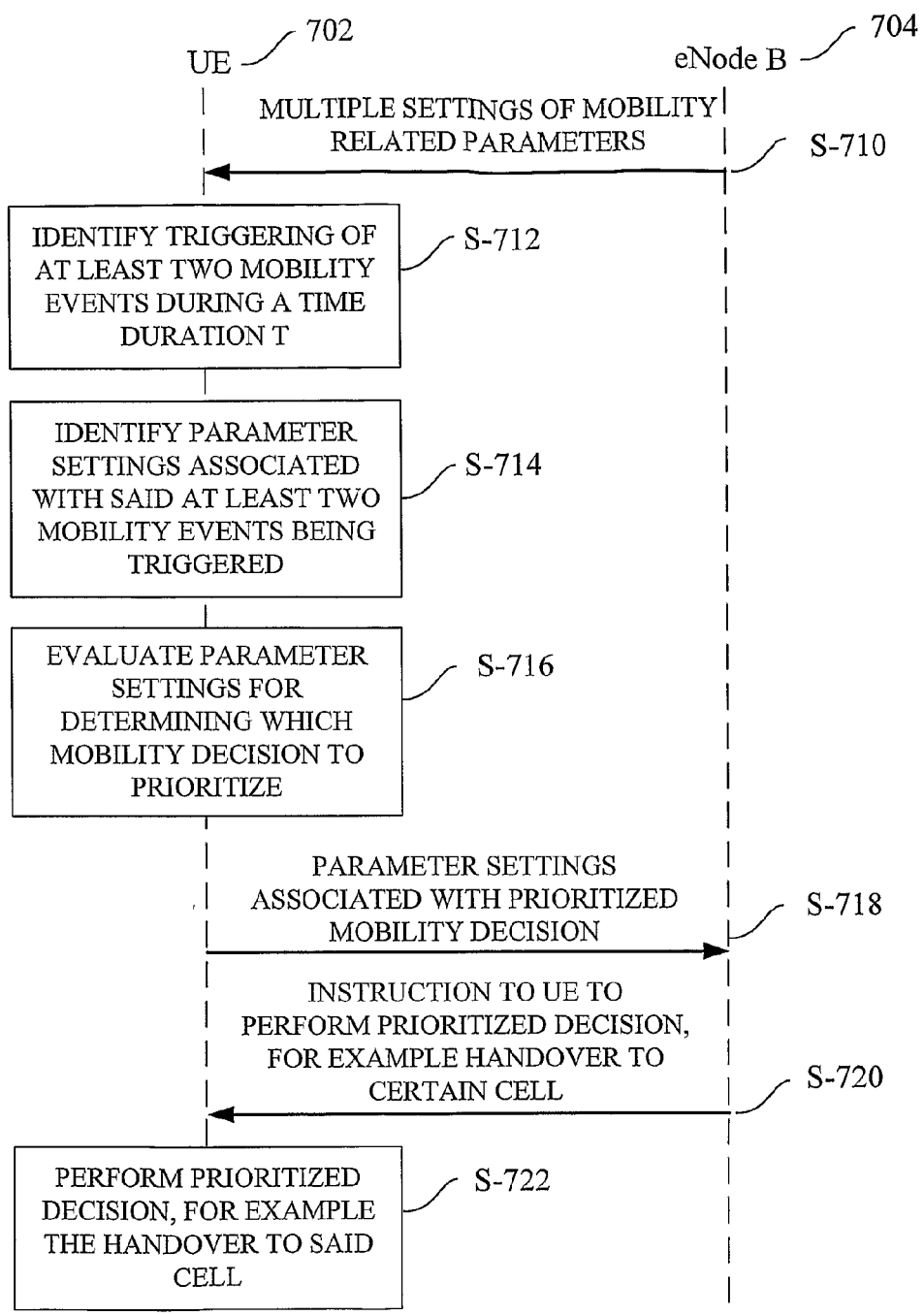

With reference to FIG. 7 illustrating a signaling scheme between a UE 702 in the connected mode and an eNodeB 704, some embodiments of the present invention will be described.

The signaling steps S-710-S-716 to be performed by the UE correspond to the signaling steps S-310-S-316 as described in relation to FIG. 3, for which reason reference is being made to the signaling steps S-310-S-316 already described.

In the subsequent step in FIG. 7, the signaling step S-718 comprises reporting parameter settings associated with the already prioritized mobility decision from signaling step S-716 to the serving base station of the UE 702.

Whereas multiple settings of mobility related parameters may be transmitted at least one base station, such as two or more, and received by UE 702 in signaling step S-710, the serving eNodeB 704 only will receive the parameter settings associated with prioritized mobility decision in signaling step S-718.

In signaling step S-720 the serving base station eNodeB 704 can then instruct the UE 702 to perform the prioritized decision corresponding to the parameter settings associated with the already prioritized mobility decision. Since the UE is in the connected mode, a handover to a certain cell according to the prioritized decision can then be performed by the UE 702, according to the signaling step S-722.

Figure 8:
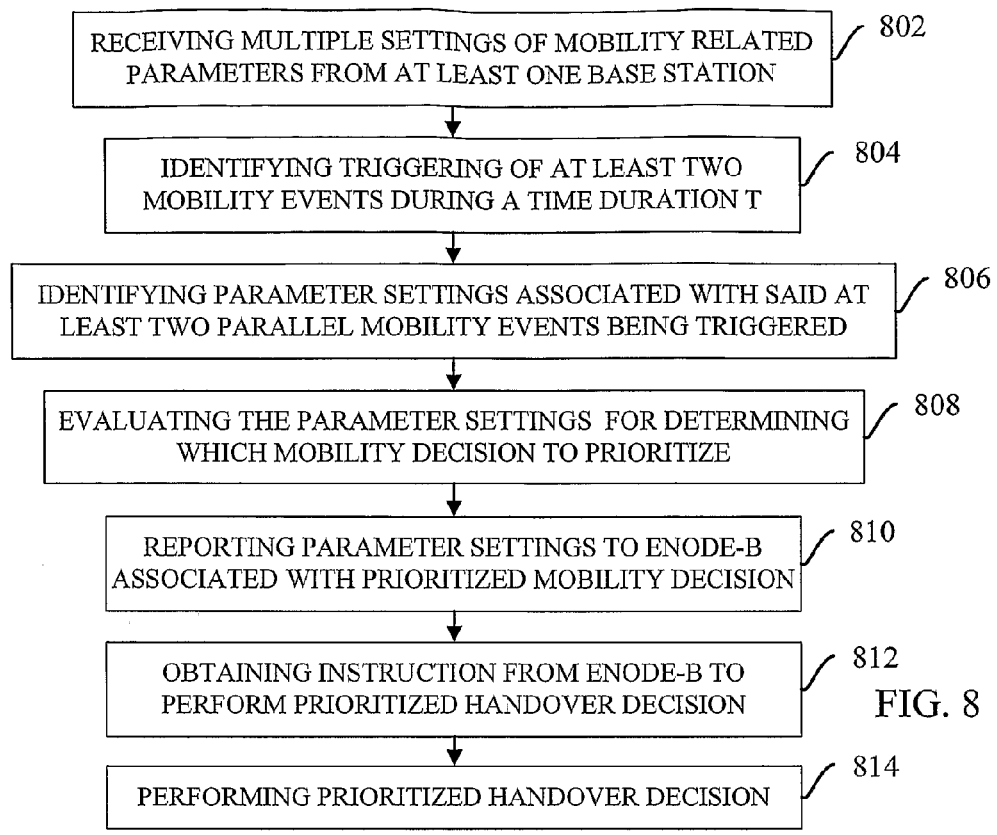

The corresponding method steps of a UE being in the connected mode, are presented in the flow-chart of FIG. 8.

Since a few method steps of the method as presented in FIG. 4, are to be repeated in the method to be presented in FIG. 8, reference will be made to method steps 402-408 of FIG. 4 for method steps 802-808 in FIG. 8.

Having evaluated the parameter settings by the comparing unit 1008 and the processing unit 1006 of the evaluating unit 1002, the following method step of the method of FIG. 8 may now be the step of reporting parameter setting associated with the prioritized mobility decision, to the serving base station, NodeB 704, step 810. This step can be performed by the processing unit 1006 that is configured to report a prioritized cell-related mobility decision to a base station of the corresponding prioritized target cell.

Thereafter the UE can receive an instruction from the eNodeB 704 to perform the prioritized handover decision, in step 812, for which reason the processing unit is configured to obtain an instruction from an eNodeB to perform the prioritized handover decision.

The following step is then to perform the prioritized handover decision, in step 814. This is thus the task according to the cell-related prioritized mobility decision, which the processing unit 1006 can be configured to perform.

As earlier described, the step of evaluating the parameter setting for determining a prioritized mobility decision may be carried out based on a few different parameter values and circumstances. According to some embodiments of the present invention the prioritized decision may be based on the highest hysteresis value as measured by the UE 702 and as being used in step 804, identifying triggering of at least two mobility events during a time duration T.

The method in a UE in the connected mode for prioritizing one of multiple cell-related mobility decisions associated with multiple parallel mobility events being triggered has thus been described.

If a majority of the triggered events correspond to the same target cell, only one of the parameter sets of the corresponding event need to be reported since they all relate to the same target cell.

Figure 9:
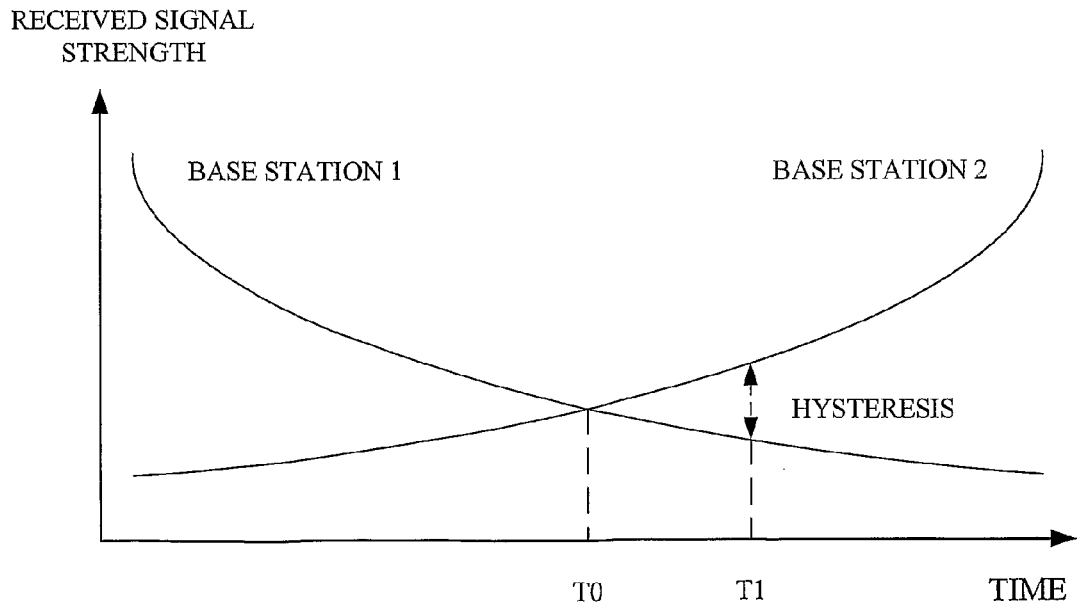
FIG. 9 illustrates a received signal strength as a function of time according to one scenario of the present invention.

In the following a schematic illustration of a measured radio parameter is presented. FIG. 9 illustrates a diagram of a Received Signal Strength (RSS) from two different base stations for a moving UE as a function of time, and serves to illustrate the concept of hysteresis parameter.

The UE is initially located in the vicinity of base station 1, as indicated by a high RSS from base station 1. The RSS from base station 2 is at the same time much lower. There is at this stage no reason to perform a cell reselection of or a handover to a cell belonging to base station 2 since the RSS value from base station 2 is much lower than the one from base station 1.

As the UE however moves and time passes, the RSS value from base station 1 decreases and the RSS from base station 2 increases. At a time T0 RSS values from base station 1 and 2 have become equal. At this stage a handover or cell reselection could be done to base station 2, but at this stage such a step could lead to a handover or cell reselection back to base station 1, for the reason being that the RSS from base station 1 and the RSS from base station 2 are equally strong.

As the UE further moves the RSS from base station 2 further increases and the RSS from base station 1 decreases. At the time T1 the UE measures that the RSS from base station 2 is stronger than the RSS from the base station 1 by a margin of the HYSTERESIS value. The UE or the base station 2 can now determine that a cell reselection or a handover, respectively, can be performed without the risking a performance deterioration due to the so called ping-pong effect. Making a decision at the time at which the HYSTERESIS criterion is met significantly reduces the risk of triggering a cell selection or handover back to base station 1.

An additional criterion may comprise a time duration parameter, whose impact could be interpreted as a time delay for the triggering of a corresponding event. For instance, referring to FIG. 9, if T1 were set as a criterion, an event could not be triggered before T1 has elapsed.

In FIG. 9 two different triggering criteria can be identified. The first criterion refers to that the RSS of base station 2 has to be stronger than the RSS from base station 1 by a margin of the HYSTERESIS value. The second possible criterion could refer to a combined usage of the time duration trigger T1 together with HYSTERESIS parameter. Triggering would only be performed when the RSS of the base station 2 is stronger than the RSS of the base station 1 with a margin of HYSTERESIS and at least T1 time has elapsed.

Figure 11:
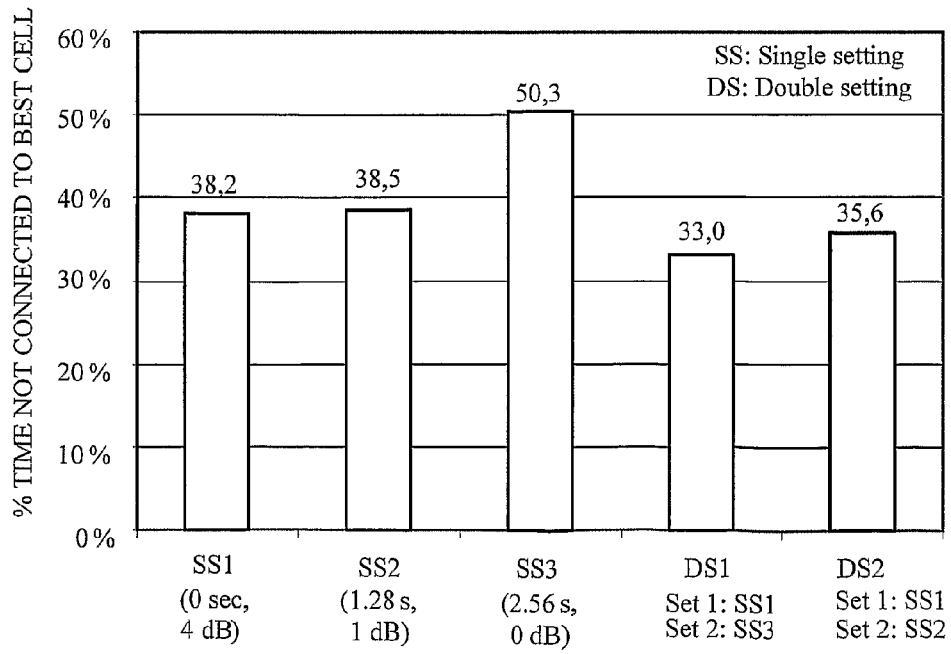
FIG. 11 illustrates a time diagram of a UE not connected to the best cell, for different scenarios of the present invention.

FIG. 11 serves as an illustration of a percentage of time a UE is not connected to the best cell for different parameter settings, comprising a time duration for delayed triggering and a hysteresis value in dB.

Five different scenarios are reported, for which the parameter settings are Single Setting (SS) 1, SS2, SS3 as well as Double Setting (DS) 1 and DS2. For parameter settings SS 1, SS 2, and SS 3, the percentage of the time the UE is not connected to the best cell is considerably high, especially the percentage for SS3, being 38.2%, 38.5%, and 50.3%, respectively. In the case of considering Double Settings (DS) for the parameter settings, as in cases DS 1 and DS 2, in a method for prioritizing a mobility decision, a lower percentage of time, 33.0% and 35.6%, respectively, that the UE is not camped onto the best cell, will result. It has thus been demonstrated that applying multiple settings herein can result in a better performance than applying a single setting.

It can be mentioned that the reported percentages are based on the fact that when the two triggers relates to different target cells, the UE is prioritizing the mobility decision to the cell for which the largest hysteresis is used. In this example the terminal speed is 200 km/h and cell radius is 288 m.

Herein described method steps of the invention may be implemented by software executed by a processor in one or several network nodes, such as, but not limited to, a mobile terminal also called UE or mobile station, and/or a radio base station also called NodeB or eNodeB.

Means mentioned in the present description can be software means, hardware means or a combination of both.

Also, while the processes described above and as illustrated in the drawings are shown as sequences of steps, this was done solely for the sake of illustration. Accordingly, it is contemplated that some steps may be added, some steps may be omitted and the order of the steps may be re-arranged.

It is explicitly stated that the above aspects of the invention may be combined in several different embodiments or in one singular embodiment.

The expression "majority" of parallel mobility events is herein understood as "majority or highest number" of parallel mobility events.

It must be emphasized that the present invention can be varied in many ways. The presented embodiments of the present invention are only a few examples of the variety of embodiments that are comprised within the present invention.

Among the advantages of at least some of the embodiments of the present invention can be mentioned:
 Better mobility management performance
 Important mobility management performance measure being the percentage of time during which a terminal is connected or camped to the best cell, can be increased
 Improved quality of service perceived by the users
 Achieving more efficient uplink radio resource utilization due to reduced signaling
 Target cell selection based on the highest hysteresis is advantageous; the Received Signal Strength (RSS) may then have its highest value.

The invention claimed is:

1. A method in a network node for prioritizing one of multiple cell-related mobility decisions associated with multiple parallel mobility events being triggered, comprising:
 responsive to multiple mobility events being triggered in parallel for a user equipment (UE), recognizing parameter settings that specify criteria for the triggering of those mobility events, wherein at least two different ones of the multiple mobility events being triggered in parallel relate to different candidate target cells for the UE,
 evaluating the parameter settings to determine which cell-related mobility decision to prioritize among different available cell-related mobility decisions that select as a target cell for the UE different ones of said candidate target cells, and
 performing a task according to the prioritized cell-related mobility decision.

2. The method according to claim 1, wherein said recognizing comprises identifying the parameter settings.

3. The method according to claim 1, wherein said recognizing comprises receiving the parameter settings.

4. The method according to claim 1, further comprising receiving from at least one base station said criteria as cell selection criteria for measuring cell signals and identifying mobility events being triggered.

5. The method according to claim 1, further comprises signaling from the network node said criteria as cell selection criteria for measuring cell signals and identifying mobility events being triggered.

6. The method according to claim 1, further comprising identifying the multiple mobility events as being triggered in parallel when those mobility events are triggered within a certain time duration of one another.

7. The method according to claim 1, wherein evaluating the parameter settings comprises at least one of:
 comparing hysteresis values of measured cell signals related to the parameter settings associated with each mobility event being triggered in parallel, and prioritizing a cell-related mobility decision, the triggered event of which has the highest hysteresis value, and
 determining whether a majority of the mobility events being triggered in parallel relates to the same candidate target cell, and, if so, prioritizing a mobility decision that selects that candidate target cell as the target cell for the UE.

8. The method according to claim 7, wherein the highest hysteresis value relates to a first candidate target cell, wherein the majority of mobility events being triggered in parallel relates to a second candidate target cell, and wherein the method further comprises prioritizing a mobility decision that selects the second target cell as the target cell for the UE.

9. The method according to claim 7, further comprising determining whether the two highest numbers of mobility events being triggered in parallel and relating to different candidate target cells are equal, and, if so, prioritizing a mobility decision that selects as the target cell of the UE whichever one of those different candidate target cells is associated with the highest hysteresis value of the measured cell signals.

10. The method according to claim 1, wherein the network node is the UE, and wherein the method further comprises reporting the prioritized cell-related mobility decision to a base station.

11. The method according to claim 1, wherein the network node is the UE, and wherein performing a task according to the prioritized cell-related mobility decision comprises performing cell reselection according to that decision.

12. The method according to claim 1, wherein the network node is the UE, and wherein performing a task according to the prioritized cell-related mobility decision comprises obtaining an instruction from a base station to perform handover to the candidate target cell that the prioritized cell-related mobility decision selects as the target cell for the UE and performing said handover.

13. The method according to claim 1, wherein the network node is a base station, and wherein performing a task according to the prioritized cell-related mobility decision comprises instructing the UE to perform handover to the candidate target cell that the prioritized cell-related mobility decision selects as the target cell for the UE.

14. The method according to claim 1, wherein a mobility event is triggered when a candidate target cell signal is stronger than a corresponding signal received from a serving cell over a certain time.

15. The method according to claim 1, wherein a mobility event is triggered when a candidate target cell signal is stronger by a hysteresis margin over a corresponding signal received from a serving cell.

16. A network node configured to prioritize one of multiple cell-related mobility decisions associated with multiple parallel mobility events being triggered, comprising:
- a recognizing circuit configured, responsive to multiple mobility events being triggered in parallel for a user equipment, to recognize parameter settings that specify criteria for the triggering of those mobility events, wherein at least two different ones of the multiple mobility events being triggered in parallel relate to different candidate target cells for the user equipment, and
- an evaluating circuit configured to be connected to the recognizing circuit, to evaluate the parameter settings to determine which cell-related mobility decision to prioritize among different available cell-related mobility decisions that select as a target cell for the user equipment different ones of said candidate target cells, and to perform a task according to the prioritized cell-related mobility decision.

17. The network node according to claim 16, wherein the network node is the UE that is configured to communicate with at least one base station in a telecommunications system, and wherein the recognizing circuit of said UE further comprises an identification circuit configured to identify the parameter settings.

18. The network node according to claim 17, wherein the identification circuit of said UE is further configured to identify said criteria as cell selection criteria from the at least one base station for measuring cell signals and identifying mobility events being triggered.

19. The network node according to claim 17, wherein the identification circuit of the UE is further configured to identify the multiple mobility events as being triggered in parallel when those events are triggered within a certain time duration of one another.

20. The network node according to claim 16, wherein the network node is a base station, and wherein the recognizing circuit of said base station further comprises a transceiving circuit configured to receive the parameter settings.

21. The network node according to claim 20, wherein the transceiving circuit of said base station is further configured to signal said criteria as cell selection criteria for measuring cell signals and identifying mobility events being triggered.

22. The network node according to claim 16, wherein the evaluating circuit further comprises:
- a comparing circuit configured to compare hysteresis values of measured cell signals associated with each mobility event being triggered in parallel, and to prioritize a cell-related mobility decision, the triggered event of which has the highest hysteresis value, and
- a processing circuit configured to determine whether a majority of the mobility events triggered in parallel relates to the same candidate target cell, and, if so, prioritize a mobility decision that selects that candidate target cell as the target cell for the UE.

23. The network node according to claim 22, wherein the comparing circuit is configured to determine that the highest hysteresis value relates to a first candidate target cell, wherein the processing circuit is configured to determine that the majority of mobility events being triggered in parallel relates to a second candidate target cell, and wherein the processing circuit is further configured to prioritize a mobility decision that selects the second target cell as the target cell for the UE.

24. The network node according to claim 22, wherein the processing circuit is configured to determine whether the two highest numbers of mobility events being triggered in parallel and relating to different candidate target cells are equal, wherein the comparing circuit is configured to determine which one of those different candidate target cells is associated with the highest hysteresis value of the measured cell signals, and wherein the processing circuit is further configured to use hysteresis data from the comparing circuit and to prioritize a mobility decision relating to the candidate target cell determined by the comparing circuit as being associated with the highest hysteresis value of the measured cell signals.

25. The network node according to claim 16, wherein the network node is the UE, and wherein the processing circuit of said UE further is configured to report a prioritized cell-related mobility decision to a base station.

26. The network node according to claim 16, wherein the network node is the UE, and wherein the processing circuit of said UE is further configured to perform a cell reselection or to obtain an instruction from a base station to perform handover to the candidate target cell that the prioritized cell-related mobility decision selects as the target cell for the UE.

27. The network node according to claim 16, wherein the network node is a base station, and wherein the processing circuit of said base station is further configured to instruct the UE to perform handover to the candidate target cell that the prioritized cell-related mobility decision selects as the target cell for the UE.

* * * * *